(12) United States Patent
Gilbert

(10) Patent No.: US 6,620,308 B2
(45) Date of Patent: Sep. 16, 2003

(54) ELECTRICALLY DISBONDING MATERIALS

(75) Inventor: Michael D. Gilbert, Brookline, NH (US)

(73) Assignee: EIC Laboratories, Inc., Norwood, MA (US)

( * ) Notice: Subject to any disclaimer, the term of this patent is extended or adjusted under 35 U.S.C. 154(b) by 197 days.

(21) Appl. No.: 09/791,121

(22) Filed: Feb. 22, 2001

(65) Prior Publication Data

US 2001/0031367 A1 Oct. 18, 2001

Related U.S. Application Data

(63) Continuation-in-part of application No. 09/352,976, filed on Jul. 14, 1999.

(51) Int. Cl.$^7$ .................................................. C09J 5/00
(52) U.S. Cl. ..................... 205/702; 205/705; 252/500; 156/344
(58) Field of Search ............................... 205/702, 705; 252/500; 156/344

(56) References Cited

U.S. PATENT DOCUMENTS

| | | |
|---|---|---|
| 3,679,534 A | 7/1972 | Weinberg |
| 4,171,240 A | 10/1979 | Wong .......................... 156/630 |
| 4,729,797 A | 3/1988 | Linde et al. ................... 134/38 |
| 4,882,399 A | 11/1989 | Tesoro et al. ................ 525/523 |
| 5,100,494 A | 3/1992 | Schmidt ....................... 156/344 |
| 5,219,679 A | 6/1993 | Abraham et al. ............ 429/192 |
| 5,252,413 A | 10/1993 | Alamgir et al. ............. 429/192 |
| 5,441,830 A | 8/1995 | Moulton et al. ............. 429/212 |
| 5,512,613 A | 4/1996 | Afzali-Ardakani et al. . 523/443 |
| 5,560,934 A | 10/1996 | Afzali-Ardakani et al. . 424/497 |
| 5,760,337 A | 6/1998 | Iyer et al. ................... 174/52.2 |

FOREIGN PATENT DOCUMENTS

| | | |
|---|---|---|
| EP | 672 094 B1 | 9/1997 |
| EP | 848 445 A1 | 6/1998 |
| EP | 852 406 A2 | 7/1998 |
| EP | 862 236 A2 | 9/1998 |
| JP | 11-134275 | * 11/2000 |

OTHER PUBLICATIONS

U.S. patent application Ser. No. 09/352,976, Gilbert, filed Jul. 14, 1999.
Gilbert, "Cleavable Thermosetting Epoxies: A Tool For Monitoring Cure Chemistry Perturbation at an Interface" *Mat. Res. Soc. Symp. Proc.* 304:49–54 (1993).
MacDonald et al., "Some Simple Equivalent Circuits for Ionic Conductors," *J. Eltroanal. Chem.* 200:69–82 (1986).
Ogino et al. "Synthesis and Characterization of Thermally Degradable Polymer Networks" *Chem. Mater.* 10:3833–3838 (1998).
Yang et al., "Reworkable Epoxies: Thermosets with Thermally Cleavable Groups for Controlled Network Breakdown," *Chemistry of Materials* 10:1475–1482 (1998).

* cited by examiner

*Primary Examiner*—Arun S. Phasge
(74) *Attorney, Agent, or Firm*—Fish & Richardson P.C.

(57) ABSTRACT

An electrochemically disbondable composition is provided having a matrix functionality and an electrolyte functionality wherein the electrolyte functionality is provided by a block copolymer or a graft copolymer. The matrix functionality provides an adhesive bond to a substrate, and the electrolyte functionality provides sufficient ionic conductivity to the composition to support a faradaic reaction at an interface with an electrically conductive surface in contact with the composition, whereby the adhesive bond is weakened at the interface. The composition may be a phase-separated composition having first regions of substantially matrix functionality and second regions of substantially electrolyte functionality. Adhesive and coating compositions and methods of disbonding also are described.

27 Claims, 9 Drawing Sheets

ELECTRICALLY DISBONDING MATERIALS

CROSS REFERENCE TO RELATED APPLICATIONS

This application is a continuation-in-part of U.S. Ser. No. 09/352,976, filed Jul. 14, 1999.

STATEMENT AS TO FEDERALLY SPONSORED RESEARCH

This invention was made with United States government support under Contract No. F08635-97-C-0036 awarded by the U.S. Department of the Air Force. The United States government has certain rights to this invention.

BACKGROUND OF THE INVENTION

The invention relates to materials for use as coatings and adhesives that may be disbanded from a surface to which they are applied without harm to that surface. The invention further relates to methods of disbonding adhesives and coatings from substrate surfaces.

Adhesive bonds and polymeric coatings are commonly used in the assembly and finishing of manufactured goods. Adhesive bonds are used in place of mechanical fasteners, such as screws, bolts and rivets, to provide bonds with reduced machining costs and greater adaptability in the manufacturing process. Adhesive bonds distribute stresses evenly, reduce the possibility of fatigue, and seal the joints from corrosive species. Similarly, polymer-based coatings are commonly applied to the exterior surface of manufactured products. These coatings provide protective layers that seal the surface from corrosive reactants, as well as provide a painted surface that can be aesthetically pleasing.

Among the best adhesives and coatings in terms of strength and durability are those based on thermosetting polymers. Typically applied as a liquid mixture of low molecular weight monomers, these adhesives wet and penetrate pores on the substrate surface. On cure, insoluble and infusible crosslinked polymers are formed that are mechanically interlocked and often covalently bound to the substrate to which they are applied. Common amine-cured epoxies are a typical example of adhesives and coatings that employ thermosetting mixtures.

Although adhesive bonds offer many advantages over mechanical fasteners, adhesive bonds are essentially permanent. There are no methods available for ready disassembly of adhesively bonded objects. The separation strategies that do exist typically involve time-consuming chemical procedures requiring high temperatures and aggressive chemicals. Examples of such techniques are described in U.S. Pat. No. 4,171,240 by Wong and U.S. Pat. No. 4,729,797 by Linde et al. These techniques, although generally effective, are quite harsh and can damage the objects being separated, making them unsuitable for many applications.

Similarly, conventional coating materials, such as polyurethanes, epoxies, phenolics, melamines, and the like, are essentially permanent. Such coatings are often removed with an aggressive chemical agent that is applied to the coating surface to degrade the coating material. Mechanical abrasion, such as sand blasting or wire brushing, is also employed. Although these techniques are effective in removing the polymer coating, they are time and labor intensive, as well as being quite harsh and likely to cause damage to the underlying surface.

To provide materials that are more easily removed from a substrate, the prior art describes adhesives formed from reactive monomers containing linkages susceptible to chemical degradation. Such materials are described in U.S. Pat. Nos. 5,512,613 and 5,560,934 to Afzali-Ardakani et al. and in U.S. Pat. No. 4,882,399 to Tesoro et al. Additionally, S. Yang et al in "Reworkable Epoxies: Thermosets with Thermally Cleavable Groups for Controlled Network Breakdown", *Chem. Mater.* 10:1475 (1998) and Ogino et al. in "Synthesis and Characterization of Thermally Degradable Polymer Networks", *Chem. Mater.* 10(12):3833 (1998) describe curable resins containing thermally labile linkages. Other polymers containing thermally labile or thermally reversible crosslinks are described in U.S. Pat. No. 3,909,497 to Hendry et al. and U.S. Pat. No. 5,760,337 to Iyer et al. An alternative approach to bond cleavage is described in U.S. Pat. No. 5,100,494 to Schmidt which discloses embedding a nichrome heating element within a thermoplastic so that the adhesive softens or melts upon resistive heating. Although these specially prepared materials are more readily cleaved from the substrate, they still require conditions that are harsh to delicate substrates or adjacent adhesive bonds.

Thus, there remains a need in the art for a material capable of being disbanded selectively and precisely under mild conditions. Such a material would provide adhesive bonds and coatings that could be employed in a variety of applications where facile removal of the material from the surface is desired.

SUMMARY OF THE INVENTION

The present invention provides a composition capable of strong, yet temporary, substrate bonding or coating that is removable without damage to the underlying substrate. It may be used in both temporary and permanent bonding and coating applications.

An electrochemically disbondable composition of the invention includes a matrix functionality and an electrolyte functionality. The matrix functionality provides an adhesive bond to a substrate, and the electrolyte functionality provides sufficient ionic conductivity to the composition to support a faradaic reaction at an interface with an electrically conductive surface in contact with the composition. The adhesive bond is weakened at the interface on application of an electrical potential across the interface. In preferred embodiments, the disbondable composition is a phase separated material having first regions of substantially matrix functionality and second regions of substantially electrolyte functionality.

The "matrix functionality" of a material is the ability of a material or a mixture of materials to join by mechanical or chemical bonding to a substrate and to adhere to the substrate by virtue of this bond. Matrix functionality also provides mechanical strength to the material, such that the material is capable of transferring load between substrates or, as a coating, is self-supporting.

The "electrolyte functionality" of a material is the ability of the material to conduct ions, either anions, cations or both. The ions are provided by a salt added to the material or are chemically incorporated into the material as an ionomer, that is, a polymer containing ionized groups. The electrolyte functionality is understood to derive from the ability of the composition to solvate ions of at least one polarity.

The term "faradaic reaction" means an electrochemical reaction in which a material is oxidized or reduced.

The term "adhesive" refers to polymer-based materials which are capable of holding materials together by surface attachment. An adhesive typically forms a bond to a substrate by mechanical interlocking and often covalent bonding to the substrate. The adhesive is chemically distinct from the bonded substrate and the bonded materials may be dissimilar from one another.

In one embodiment of the invention, the matrix functionality is provided by a polymer selected from the group consisting of epoxies, phenolics, acrylics, melamines, maleimides, and polyurethanes.

In another embodiment of the invention, the polymer has a variable crosslink density to form regions of low crosslink density having a relatively high ionic conductivity and regions of high crosslink density having a relatively high mechanical strength.

In another embodiment of the invention, the polymer includes coordination sites that are capable of solvating ions and that support the electrolyte functionality of the composition.

In other embodiments, the electrolyte functionality is provided by an electrolyte additive selected from the group consisting of ionically conductive monomers, oligomers and polymers, and ionomers and may be localized in regions within the polymer to form a secondary phase of high ionic conductivity and mobility.

In one preferred embodiment, the disbondable composition is an adhesive, and may have a lap shear strength in the range of 2000–4000 psi. In another preferred embodiment, the composition is a coating, and may be resistant to delamination from a substrate to which it is applied.

In another aspect of the invention, an electrochemically disbondable composition is provided having an uncured polymeric material having an electrolyte located therein. The uncured polymeric material, when cured, provides in combination with the electrolyte, sufficient solubility and mobility to the electrolyte to support a faradaic reaction at a surface in electrical contact with an electrode.

Another aspect of the invention includes a corrosion resistant coating in which a substrate subject to corrosion has as a coating a composition having a matrix functionality and an electrolyte functionality, the matrix functionality providing an adhesive bond to the substrate, and the electrolyte functionality providing sufficient ionic conductivity to the composition to support a faradaic reaction at an interface with the substrate. In yet another aspect of the invention, a bonded structure includes two electrically conductive surfaces, and a bond between the two surfaces composed of the electrochemically disbondable composition of the invention. The conductive surface may be an article or articles to be secured by the bond or they may be a conductive element selected from the group consisting of sheets, foils, grids and meshes. The conductive element further may be bonded to an article using a conventional adhesive or the disbondable composition of the invention.

In one embodiment of the invention, the electrically conductive surface is an electrically conductive coating applied to a substrate, which may be non-electrically conducting.

In another embodiment of the invention, the bonded structure includes first and second electrically conductive surfaces; and an electrically conductive element disposed therebetween. The electrochemically disbondable composition of the invention is used to bond the electrically conductive element to the first and second conductive surfaces.

A laminate structure is also provided which is particularly advantageous in the joining of irregular or non-conductive surfaces. The laminate includes first and second electrically conductive elements selected from the group consisting of foils, sheets, meshes and grids, and the disbondable composition of the invention disposed therebetween and bonded to the first and second elements.

In another aspect of the invention, a method is provided for disbanding a composition from an electrically conductive surface to which it is bonded. The method includes providing a first electrically conductive surface treated with the electrochemically disbondable composition of the invention, contacting a second electrically conductive surface to the composition, and passing an electric current through the disbondable composition to cause a faradaic reaction at the surface, whereby the bond to the surface is weakened.

The bond between the disbondable composition and a substrate may be weakened in a short time by the flow of electrical current across the bondline between the substrate and the composition. Typically, the bond is weakened sufficiently that the substrate is separated easily by hand from the disbondable composition. At least one of the substrates separates cleanly and is substantially free from any residual bonding composition. Because the disbanding procedure uses electricity instead of heat or chemical reagents, inadvertent disbanding during normal use is unlikely.

In yet another aspect of the invention, an electrochemically disbondable composition having a matrix functionality and an electrolyte functionality, the matrix functionality providing an adhesive bond to a substrate, and the electrolyte functionality providing sufficient ionic conductivity to the composition to support a faradaic reaction at an interface with an electrically conductive surface in contact with the composition is provided, wherein the electrolyte functionality includes a block copolymer or a graft copolymer.

In one embodiment, the graft polymer includes a siloxane backbone and pendant blocks of high ionic conductivity, and the pendent blocks may include polyether or polyglycol moieties. In another embodiment the graft copolymer includes dimethicone polyols. The graft copolymer may be selected from the group consisting of dimethyl-methyl (polyethylene oxide) siloxanes, alkoxylated 3-hydroxypropyl-terminated dimethyl siloxanes, and dimethyl-methyl(3-hydroxypropyl) siloxanes.

In another embodiment of the invention, the block copolymer includes a linear block copolymer having matrix miscible and matrix immiscible blocks. The matrix miscible blocks may be selected from the group consisting of aliphatic and aromatic polyethers, nitrile-functionalized polymers, acrylic and vinyl polymers and polyamides. The matrix immiscible blocks may be selected from the group consisting of aliphatic and aromatic hydrocarbon polymers, acrylic and vinyl polymers, silicone polymers, phosphazine polymers, fluoropolymers, polysulfides, polyesters, polyamides and rigid-rod polymers.

In one embodiment, the linear block copolymer includes polyethylene-block-poly(ethylene glycol), or poly(ethylene glycol)-block-poly(propylenene glycol)-block-poly (ethylene glycol).

In other embodiments, the matrix functionality is made up of a polymer selected from the group consisting of epoxies, phenolics, acrylics, melamines, maleimides, and polyurethanes, and combinations thereof.

In still other embodiments, the electrolyte functionality includes a salt capable of being solvated into the composition, such alkali metal, alkaline earth and ammonium salts. The salt may include an anion selected from the group consisting of hexafluorophosphate, tetrafluoroborate, hexafluoroantimonate, and perchlorate, or it may be selected singly or as a mixture from the group consisting of lithium trifluoromethane sulfonimide and lithium trifluromethane sulfonate.

In still other embodiments, the composition has an ionic conductivity in the range of $10^{-11}$ to $10^{-5}$ S/cm$^2$; may further comprise an additive selected from the group consisting of pigments, corrosion inhibitors, leveling agents, gloss promoters, rubber tougheners and fillers; or may be an adhesive or coating.

In another aspect of the invention, an electrochemically disbondable composition is provided having a curable material having an electrolyte located therein, wherein electrolyte functionality is provided by a block copolymer or a graft copolymer. The uncured polymeric material, when cured, provides in combination with the electrolyte, sufficient ionic conductivity to support a faradaic reaction at a surface in electrical contact with an electrode. The curable material may be selected from the group consisting of epoxy resins, phenolic resins, acrylic resins, melamine resins, malemide resins, and urethanes.

In still another aspect of the invention, a bonded structure includes two electrically conductive surfaces and a bond between the two surfaces. The bond includes an electrochemically disbondable composition having a matrix functionality and an electrolyte functionality, the matrix functionality providing an adhesive bond to a substrate, and the electrolyte functionality providing sufficient ionic conductivity to the composition to support a faradaic reaction at an interface with an electrically conductive surface in contact with the composition, wherein the electrolyte functionality includes a block copolymer or a graft copolymer.

In still another aspect of the invention, a method for disbonding a composition from an electrically conductive surface to which it is bonded is provided. The method includes providing a first electrically conductive surface treated with an electrochemically disbondable composition having a matrix functionality and an electrolyte functionality, wherein the electrolyte functionality is provided by a block copolymer or a graft copolymer. The matrix functionality provides an adhesive bond to the first conductive surface, and the electrolyte functionality provides sufficient ionic conductivity to the disbondable composition to support a faradaic reaction at an interface of the first conductive surface and the disbondable composition. A second electrically conductive surface is contacted to the disbondable composition, and a voltage is applied across the disbondable composition to cause a faradaic reaction at the first conductive surface, whereby the bond to the first conductive surface is weakened.

BRIEF DESCRIPTION OF THE DRAWING

The invention is described with reference to the figures which are presented for the purpose of illustration only and which are not limiting of the invention, and in which.

DESCRIPTION OF THE PREFERRED EMBODIMENTS

Figure 1:
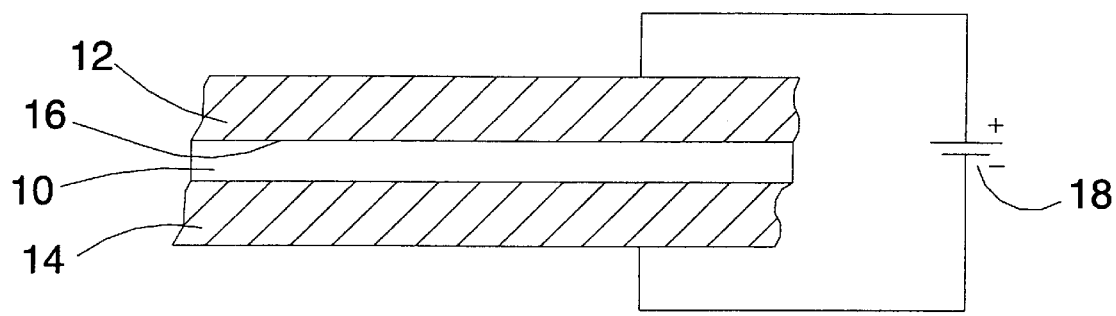
FIG. 1 is a cross-sectional illustration of a bonded joint using the composition of the invention and of the disbanding operation of the invention.

The electrochemically disbondable composition of the invention possesses matrix functionality and electrolyte functionality, where the electrolyte functionality provides sufficient ionic conductivity to support a faradaic reaction at an electrically conductive substrate in contact with the composition. The matrix functionality of the disbondable composition provides the adhesive or coating properties needed for its intended use, while the electrolyte provides the ionic conductivity and ion mobility needed to maintain the faradaic reaction.

The electrically conductive substrate may be a surface of the article being bonded or coated. Alternatively, the electrically conductive substrate may be one added to the coating or bond to provide an electrochemically cleavable surface.

The adhesive property of the composition is disrupted by the application of an electrical potential across the bondline between the composition and substrate. While not bound to any particular mode of operation, the faradaic reactions which take place at the composition/substrate interface are presumed to disrupt the interaction between the disbondable material and the substrate, thereby weakening the bond therebetween. Disruption at the adhesive interface may be the result of a number of processes taking place at the interface, such as chemical degradation of the disbondable material, gas evolution at the substrate interface and/or material embrittlement, possibly by changes in crosslink density of the disbondable composition.

Matrix functionality may be provided by one of the general classes of polymers and polymer resins used in bonding or coating surfaces. The materials may be prepared from commercially available polymer resins, often without modification.

The polymer may be a thermoset polymer, which provides high strength and solvent resistance to the bond or coating, but which is difficult to remove from the surface. A thermoset polymer is one in which a linear or crosslinked network extends throughout the final composition to provide a polymer that is stable to heat and that does not flow or melt. The polymer is typically formed by in situ reaction or curing of lower molecular weight species, e.g., epoxies, or by the chemical transformation of soluble precursor polymers, e.g., formation of polyimide from polyamic acid. Exemplary thermosetting polymers include highly condensed polyimides, polyurethanes, epoxies, phenolic resins, urea or melamine formaldehyde condensates, acrylic resins and alkyd resins. A preferred polymer resin for use as an adhesive or a coating is epoxy.

The polymer may also be a thermoplastic which is thermally tractable and can be made to soften or flow with the application of heat. These polymers are linear or lightly branched and are typically soluble in some solvent. Exemplary thermoplastic polymers include acrylics, styrene/butadiene block copolymers and the like.

The above polymers are well suited to provide the matrix functionality of the composition; however, in order to support a faradaic reaction at an electrically conductive substrate, the disbonding composition also must possess sufficient ion conductivity to permit ion transport within the composition. Modification of the polymer to promote or support ionic conductivity or to promote ion solubility therefore is contemplated.

In one embodiment of the invention, the polymer includes ion-coordinating moieties that are capable of solvating ions, and in particular cations, of the electrolyte. Exemplary ion-coordinating moieties include alkoxy groups, such as methoxy or ethoxy, and oligoethers, such as polyethylene oxide and the like, disulfide moieties, thioalkyl groups, alkyl or alkenyl nitrile groups and polyvinylidene fluoride groups. By way of example only, an epoxy resin may be cured using a diamine having a high alkoxy content to provide additional oxygen sites for cation coordination. Example 2 describes the use of the diamine, 4,7,10-trioxy-1,13-tridecanediamine, for this purpose.

Another manner in which the polymer supports or promotes the dissolution and diffusional movement of the ions found in the electrolyte is to have a glass transition temperature $T_g$ that is below the disbanding temperature. This can be achieved by increasing the disbonding temperature, or adding a plasticizer to the polymer composition. The term "plasticizer" means an electrochemically stable additive which tends to reduce the crystallinity or order of the composition. Exemplary plasticizers include alkyl carbonates, low molecular weight alkoxides, cyclic esters, alcohols, nitrites, amides and ureas. Many other plasticizers well-known to skilled artisans may also be employed advantageously to lower $T_g$. It can be additionally advantageous if the plasticizing molecules are capable of solvating ions, as are the above-mentioned exemplary plasticizers. By solvating ions, the plasticizer additive increases the concentration of salts that may be added to the composition to provide ionic conductivity (see below).

Heterogeneous curing can also be used to affect a low $T_g$. A heterogeneously cured thermosetting resin is one in which the crosslink density or degree of polymer condensation varies throughout the composition resulting in regions of high and low glass transition temperatures. This may be achieved by locally varying the amount of crosslinking or curing agent in the polymer.

In one embodiment of the invention, a heterogeneously cured polymer is obtained by adding a component to the polymer resin which serves as a reservoir for excess curing agent or crosslinking agent. Exemplary reservoirs include porous ceramics such as zeolites, clays or polymer gels. By way of example only, a zeolite may be infused with an excess of amine curing agent and mixed into an epoxy polymer resin. The presence of the excess amine during a thermally activated cure results in the formation of a heterogeneous material having local regions of high amine content and low crosslink density near the zeolite particles embedded in a matrix of stoichiometric, high crosslink density material. Ideally, the regions of low crosslink density connect to form continuous pathways with lower glass transition and higher ionic conductivity.

In some embodiments of the invention, the electrochemically disbondable composition includes a separate electrolyte phase to provide the electrolyte functionality of the disbondable composition. An electrolyte may be used in combination with any of the above-mentioned polymers. The electrolyte may be an ionically solvating molecule, including a plasticizer, or an oligomer or polymer also capable of solvating ions. Typically, ion solvation is obtained with polar molecules or molecules that are easily polarized. The electrolyte may also constitute a portion or region of a polymer which is added to the composition. For example, the disbondable composition may include a block or graft copolymer having regions of high ionic conductivity and regions having some other desirable property, such as compatibility with the polymer resin. The polymer resin-miscible domains promote dispersion of the block copolymer throughout the entire resin, with the polar, ionically conductive regions associating into domains or micelles. Without the polymer resin-miscible domains, certain combinations of polymer and electrolyte may not be sufficiently compatible to form a cohesive composition and mechanical and/or adhesive strength would be compromised.

The electrolyte functionality of the disbondable composition provides ionic conductivity sufficient to maintain a faradaic reaction at an interface with an electrically conductive surface. Sufficient conductivity may be readily established by preparing a composition and applying a voltage across a bondline with an electrically conductive substrate. If current flow is observed, a faradaic reaction at the bondline may be assumed. Sufficient ionic conductivity also may be empirically observed by applying a voltage across the bondline and noting whether the bond is weakened. Compositions with ionic conductivities in the range of $10^{-11}$ to $10^{-5}$ S/cm$^2$ at room temperature are considered within the scope of the invention. Materials having higher ionic conductivities require shorter disbanding times. Compositions with ionic conductivities in the range of $10^{-9}$ to $10^{-7}$ S/cm$^2$ at room temperature are preferred.

The electrolyte is desirably ionically conductive and capable of supporting ion diffusion of a salt solvated therein. In most embodiments, complex ion salts are added to the composition to provide ionic conductivity. Suitable salts include alkali metal, alkaline earth and ammonium salts. Preferred salts include polyatomic, high dissociation constant anions, such as hexafluorophosphate, tetrafluoroborate, hexafluoroantimonate, trifluoromethane sulfonate, trifluoromethane sulfonimide and perchlorate.

In another embodiment, the electrolyte functionality is provided by an ionomer. The ionomer is a polymer or oligomer with ionized groups that provide ions capable of being solvated in the composition.

The electrolyte is included in the disbondable composition in an amount sufficient to provide the requisite ionic conductivity to support the faradaic reaction of the disbanding process. The actual amount of electrolyte used in a particular composition is dependent on the ionic conductivity of the polymer and the ability of the electrolyte to form a continuous conductive pathway within the composition. While a continuous pathway is not absolutely required, it promotes the efficiency of the process. Where ions are required to tunnel through regions of higher resistance, higher voltages and longer times are required for disbonding.

In preferred embodiments, approximately equal volumes of the matrix polymer and the electrolyte are used, although a wider range of compositions is contemplated as within the scope of the invention. Those skilled in the art are aware that a wide range of compositions may be used to obtain a substantially continuously conductive electrolyte phase depending upon the materials used and how the composition phase separates. In some instances, a seemingly high level of electrolyte, e.g., 50 vol %, may be added without overly compromising the adhesive or mechanical properties of the disbondable composition. The composition is presumed to maintain its strength due to the ionic strengthening typically observed in polymeric systems containing salts or ionomers.

Ionic domains may form, acting as pseudo-crosslinks in the ionically conductive regions or as crosslinks between the conductive region and the matrix polymer.

In preferred embodiments, the disbondable composition is a phase-separated composition having regions enriched in electrolyte having high ionic conductivity and regions enriched in matrix polymer having high mechanical or bonding strength. A phase-separating composition may comprise an initially miscible mixture of polymer resin and electrolyte. The electrolyte may segregate from the growing resin network during cure. Phase separation may be encouraged by increasing the molecular weight of the polymer resin, oligomeric (or polymeric) electrolyte additive, or both.

In preferred embodiments, phase separation results in regions having high ionic conductivity forming a continuous pathway within the composition. Without a continuous pathway, ions are required to traverse the high strength, low conductivity regions of the material during electrochemical disbonding. Bicontinuous or interpenetrating networks advantageously provide a continuous ionically conductive pathway without compromise to the mechanical strength of the adhesive polymer resin. Phase-separated compositions having the desired microstructure may be obtained by varying the relative proportions of the various components of the disbondable composition. For example, a composition comprising approximately equal parts by volume of polymer and electrolyte may cure to provide a continuous ionically conductive pathway.

A preferred electrolyte additive for formation of a phase-separated microstructure is a block copolymer having a backbone with a low affinity for the polymer resin and pendant polymer blocks of high ionic conductivity. The low affinity backbone serves as a nucleation point for phase separation by generating small non-solubilized domains within the pre-cured resin, while the high ionically conductive pendant polymer blocks interact with the matrix polymer resin. During cure, the ionically conductive polymer phase separates from the curing resin and collapses toward the low solubility domains which results in a well dispersed and continuous network.

Classes of block copolymers that provide electrolyte functionality have been identified. A preferred block copolymer is a graft copolymer. A graft copolymer may be a comb polymer. The comb polymer is a graft copolymer in which blocks or pendant oligomeric chains of a dissimilar polymer are more or less regularly repeated along the polymer backbone. Preferred graft copolymers include dimethicone polyols. An exemplary dimethicone polyol includes a siloxane backbone grafted with amine-terminated poly(ethylene glycol) pendant blocks such as poly(dimethylsiloxane-co-methyl(3-hydroxypropyl)siloxane-graft-poly(ethylene glycol) 3-aminopropylether (CAS No. 133779-15-4).

Other exemplary dimethicone polyols include polyether modified polysiloxanes, such as that available from Goldschmidt Chemical Company as TEGOPREN 5843, or dimethyl-methyl(polyethylene oxide) siloxanes such as that available from Dow Coming Corporation as 193 SURFACTANT. Another preferred dimethicone polyol is ethoxylated 3-hydroxypropyl-terminated dimethyl siloxane such as that available from Dow Corning Corporation as 29 ADDITIVE. Many dimethicone polyols of various molecular weights, polyol/dimethicone ratio (also referred to as the hydrophilic/lipophylic balance), pendent group number and chain length, and pendant group terminal functionality are known to skilled artisans and the particular embodiments described are not limiting of the invention. In another embodiment, linear block copolymers are preferred additives in producing electrically disbonding compositions. Preferred linear block copolymers have matrix miscible and matrix immiscible blocks of different composition. By way of example, polyethylene-block-poly(ethylene glycol), a linear block copolymer having 50% by weight polyethylene glycol, (CAS 97953-22-5) is combined with resins providing matrix functionality to provide a disbondable composition. Other exemplary linear block copolymers include poly(ethylene glycol)-block-poly(propylenene glycol)-block-poly(ethylene glycol).

For disbanding compositions in which epoxies provide matrix functionality, immiscible blocks include a wide variety of aliphatic or aromatic hydrocarbon polymers, many acrylic and vinyl polymers, silicone polymers, phosphazine polymers fluoropolymers, polysulfides, polyesters, polyamides, and rigid-rod polymers. Epoxy miscible blocks include many aliphatic and aromatic polyethers, nitrile functionalized polymers, certain acrylic and vinyl polymers, and polyamides. Skilled artisans will recognize that many linear block copolymers having matrix miscible and immiscible regions are conceivable and the examples given are not limiting of the invention.

In a further embodiment of the invention, the cohesive strength of the disbonding composition may be enhanced through the use of ionically modified oligomers (as the electrolyte component). For example, amine-functionalized oligomers (such as the amine-terminated poly(siloxane)-graft-poly(ethylene glycol) described above) may be converted to the corresponding ammonium salt by ion exchange of the amino group with an ammonium cation. The resulting highly viscous electrolyte is readily miscible with polymer resins, and in particular with amine-curable epoxy resins. A mixture of approximately equal volumes of the ion-exchanged electrolyte and epoxy resin can be cured to form a high cohesive strength adhesive material possessing sufficient ionic conductivity to support electrochemical disbonding.

While the invention has been described primarily with reference to epoxides, other polymer resins may be used in accordance with the invention.

For example, bismaleimides may be directly substituted for epoxies in the electrochemical disbondable formulations. Selection of the appropriate bismaleimide is made to ensure adequate phase separation of the polymer matrix phase from the ionically conducting phase. The highly polar, ion coordinating ability of the cyclic imide group may result in compatibilizing ionic interactions occurring between the two phases. To overcome this, the bismaleimide can be modified to decrease its polarity in order to increase cure-induced phase separation. These adjustments are made empirically to achieve phase separation, while controlling the phase dimensions and degree of mechanical connectedness between the phases.

Admixtures of a comb polymer, such as those described above, with monomers of thiols and trienes according to eq. 1 would also yield a homogeneous mixture. Free radical polymerization by thermal decomposition of azobis (isobutylnitrile) (AIBN) would result in network polymer formation and phase separation of the comb polymer. Control of phase morphology, dimension and interphase interaction are also mediated by inclusion of ammonium salt modified alkyl thiols.

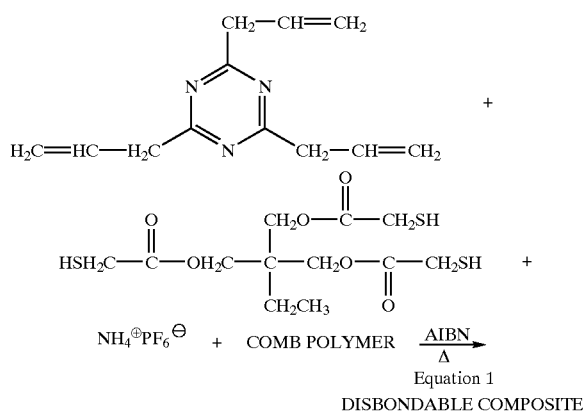

Equation 1
DISBONDABLE COMPOSITE

In another embodiment of the invention, phenolic or melamine resins are used for the disbondable material of the invention. Self-condensing resins such as phenolics or melamine (urea)/formaldehyde may be modified with ionically conductive oligomers or polymers and then cured to form phase separated materials provided that the ionically conductive additive contains no functionalities that will condense with formaldehyde. Phase separation is controlled by adjusting the moieties present in the matrix resin and ionically conductive additive to favor late-stage phase separation and possibly by pre-seeded nucleation using compatible/incompatible copolymer blocks, as is discussed hereinabove. Ionic modification, most likely using sulfonate or ammonium groups to both the matrix resin and ionically conductive additive, could be used to control phase morphology, dimension and interphase reactions.

It is understood that additives may be included in a disbanding composition so long as they do not compromise the bonding strength or ionic conductivity of the composition. Exemplary additives include pigments for color, corrosion inhibitors, leveling agents, gloss promoters and fillers. Other polymer resin additives, known to those of skill in the art, such as rubber tougheners, e.g., poly(acrylonitrile-co-butadiene), may be added to increase electrolyte solubility or enhance other desirable properties of the resin. The disbondable composition further may include particles of a non-conducting material, e.g., crushed glass or plastic beads, to prevent conductive surfaces useful in the disbanding process from contacting each other and forming a short circuit. Other additives will be apparent to those skilled in the art and are within the scope of the invention.

The solubilizing ability of the uncured composition and the post-cured composition may differ. Thus, initially soluble additives may be excluded from the composition as it cures. In some embodiments, additives may be selected for incorporation into the disbondable composition to retain their solubility in the cured polymer. In other embodiments, differing pre- and post-cured solubilities may be used to advantage in obtaining phase-separated materials (see below).

The disbondable compositions may be used as adhesives. A bonded joint may be obtained by disposing a disbondable composition between two or more surfaces such that the composition forms an adhesive bond to each surface and holds each surface in a generally fixed position relative to the other surfaces while maintaining those positions in response to a force equal to at least the weight of the lightest bonded element.

A bonded joint may be obtained by applying an adhesive of the invention to a suitable surface as a solution, a melt or a reactive mixture. Solvents, if used, may be removed by evaporation prior to mating the substrates or may be absorbed by the coated substrate. Compositions applied as a melt, a solution or a reactive mixture wet the substrates and then solidify in order to achieve a high level of adhesion. When applied as a reactive mixture, the composition undergoes a curing reaction that converts the fluid-like mixture to a solid. The latter method of application is typically used for common two-component adhesives, such as conventional epoxies.

The disbondable material of the invention may also be applied as a coating to a substrate surface. Due to the material's anti-corrosive properties (discussed hereinbelow), it is advantageously employed as an undercoating or primer layer. As in the formation of a bonded joint, the disbondable material may be applied to a suitable surface as a solution, a melt or a reactive mixture. It is within the scope of the skilled artisan to prepare formulations suitable for coating applications.

The strength of an adhesive bond may be determined in various ways. Typically, lap shear strengths are used as a measure of the strength of an adhesive bond. Shear strength is the force required to separate two overlapping plates when pulling in a direction parallel to the plane of the plates. Following ASTM procedure D-1002, an Instron tester or suitable alternative instrument is used for this purpose. Bonds formed using disbondable compositions are capable of high strength, having shear strengths of greater than 200 psi, preferably on the order of 1000 psi, and more preferably 2000 psi and as high as 4000 psi. Disbondable compositions employing epoxies for matrix functionality generally provide shear strengths in the range of 2000–4000 psi using this configuration. This is comparable to the shear strengths of conventional epoxy resins. Thus, it is possible to form an electrochemically disbondable joint without compromise to the mechanical strength of the bonded materials.

As described previously, ionic conductivity is a necessary feature of the disbondable composition. The rate of the disbonding faradaic reaction, and hence the time necessary to achieve the desired level of bond weakening, is determined by the ionic current flowing through the composition. This current can be measured in the external circuit using an ammeter. The magnitude of the current is small, typically less than 1 mA/cm$^2$ of bonded area when the disbanding voltage is initially applied. The current further decreases with time, often decaying to 0.2 mA/cm$^2$ or less after one minute. Although the relationship between current and disbonding voltage is not strictly linear, the use of higher disbanding voltages results in higher currents and more rapid disbandment. Likewise, the use of low disbonding voltages results in longer disbandment times. The practitioner may select a disbonding voltage from a few volts to greater than 100 volts depending on the desired disbandment time and other considerations such as safety and the need to prevent damage to voltage-sensitive substrates.

The disbandment time at a particular disbonding voltage also depends on the ionic conductivity of the composition. Higher ionic conductivities permit higher currents at a given voltage and correspondingly support an increase in the rate of the disbanding reaction. However, the disbonding reaction occurs substantially at the interface between the composition and the substrate and the amount of faradaic charge (the time integral of the faradaic current) required to effect disbandment is very small. Therefore, to achieve disbonding in a practical period of time requires only a small current and the level of ionic conductivity which is needed to support this activity is relatively low. This feature is advantageous because the formulation of materials with high ionic conductivity leads to poor adhesive properties and limited mechanical strength.

The magnitude of ionic conductivity suitable for the disbonding process may be understood by measurement of the ionic conductivity of the disbondable composition described in Example 3. Ionic conductivity is determined using the AC impedance technique in which the complex impedance of the composition is measured over a wide frequency range (5–$10^5$ Hz) and the data is fit to a simple circuit model. This method has been previously described; see, MacDonald et al., *J. Electroanal. Chem.* 200:69–82 (1986). Values for ionic conductivity as a function of temperature are listed in Table 1.

TABLE 1

Conductivity measurements

| Temperature (° C.) | Conductivity (S/cm) |
|---|---|
| 0 | $1.1 \times 10^{-8}$ |
| 20 | $2.3 \times 10^{-7}$ |
| 40 | $1.6 \times 10^{-6}$ |
| 60 | $7.0 \times 10^{-6}$ |
| 80 | $2.1 \times 10^{-5}$ |

Although the conductivities listed in Table 1 for the composition of Example 3 are considerably smaller than conductivities of electrolytes used in electrochemical devices (ca. $10^{-3}$ S/cm), the conductivity is sufficient to achieve disbonding at room temperature with an applied voltage greater than 10 V. The disbanding time can be a few seconds to several minutes depending on the load on the bond.

The foregoing embodiments teach a disbondable composition having matrix and electrolyte functionalities which permit controlled disbanding of the composition from an electrically conductive substrate in response to an electrical voltage applied between the substrate and composition.

With reference to FIG. 1, a method includes passing an electrical current through a disbondable composition 10 in contact with electrically conducting substrates 12, 14 to disrupt the bonding at an adhesive/substrate interface 16 and thereby weaken the bond therebetween. Current is supplied to the composition using an electrical power source 18. When an electrical voltage is applied between the two substrates 12, 14 electrochemical reactions occur at the substrate/disbonding composition interfaces. The electrochemical reactions are understood as oxidative at the positively charged or anodic interface and reductive at the negatively charged or cathodic interface. The reactions are considered to weaken the adhesive bond between the substrates allowing the easy removal of the disbondable composition from the substrate. (Note, for the purposes of discussion in all Figures one of the electronically conductive surfaces is designated as the positive electrode. It is understood that the polarity of the system may be reversed.) The electrical power source may supply direct or alternating current. Direct current may be supplied from a battery or an AC-driven, DC power source.

Most disbonding processes require a voltage of only several volts, for example, less than 10 volts. However, higher voltages, e.g., on the order of up to 100 volts, may be useful to overcome the electrical resistance inherent in the system. Very little current, ca. $10^{-3}$ amps per square centimeter, is required to complete disbonding. Disbonding is accomplished rapidly, regardless of the complexity of the surface to be disbanded. In many cases, a potential is applied for a time period in the range of about 5 to 60 minutes, and preferably about 10 to 30 minutes.

The electrochemically disbondable composition may be selected so that disbonding occurs at either the positive or negative interface. The positive interface is the interface between the electrochemically disbondable composition and the electrically conductive surface that is in electrical contact with the positive electrode. Similarly, the negative interface is the interface between the electrochemically disbondable composition and the electrically conductive surface that is in electrical contact with the negative electrode. Disbonding occurs at the positive interface for the disbonding compositions described in Examples 1–4 below. By reversing current direction prior to separation of the substrates, the bond may be weakened at both substrate interfaces.

In an alternative embodiment, alternating current may be used to simultaneously disbond both substrate/adhesive interfaces. This embodiment is particularly useful when removal of the disbondable composition from both substrates after disbanding is desired. Typically, the alternating current reverses the anodic and cathodic interfaces on a time scale that is short compared with the total time necessary to disbond the interfaces. The current can be applied with any suitable waveform, provided sufficient total time at each polarity is allowed for disbanding to occur. Sinusoidal, rectangular, and triangular waveforms are appropriate. The waveform may be applied from a controlled voltage or a controlled current source.

Alternative formulations may be employed for cathodic disbanding. Such an embodiment is described in Example 7.

Figure 2:
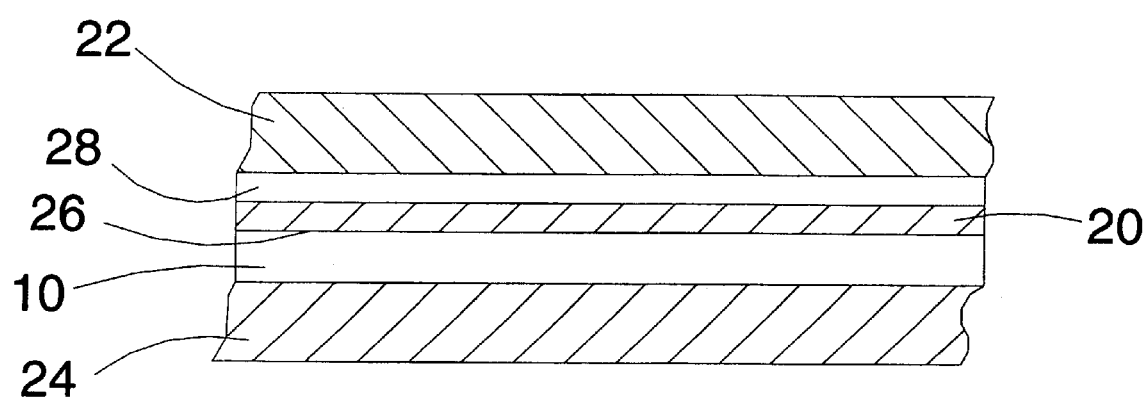
FIG. 2 is a cross-sectional illustration of an embodiment of the invention incorporating a conductive foil into a bonded structure.

Non-conductive or non-conductively coated substrates my also be electrochemically disbonded by incorporation of an additional conducting element to complete the electrical circuit. With reference to FIG. 2, a conducting element 20 is incorporated into the bonding structure in those instances when one of the substrates 22 is non-conductive or coated with a non-conductive layer. A voltage is applied between the conducting element 20 and an electrically conductive substrate 24 having a disbondable composition 10 disposed therebetween. Disbonding occurs at either conductive element/disbonding composition interface 26 or at substrate 24 depending on the arrangement of the electrical circuit and the choice of the composition. Conducting element 20 is bonded on its opposite face to the non-conducting substrate 22 by adhesive 28, which may be either a conventional adhesive or the electrochemically disbondable composition of the invention. It is contemplated that the use of a conducting element in joints and disbanding operations is not limited to non-conductive substrates and may also be used with conductive substrates.

The electrically conductive element may be any electrically conducting material capable of being embedded between two bonded surfaces. Exemplary elements include, but are not limited to, wire mesh, metal foil, and a conductive coating, e.g., a silver-filled epoxy. In those instances where the conductive element is a wire mesh or grid, the mesh size should provide adequate surface area contact for the disbondable material since bond weakening occurs in those areas in close proximity to the substrate.

Figure 3:
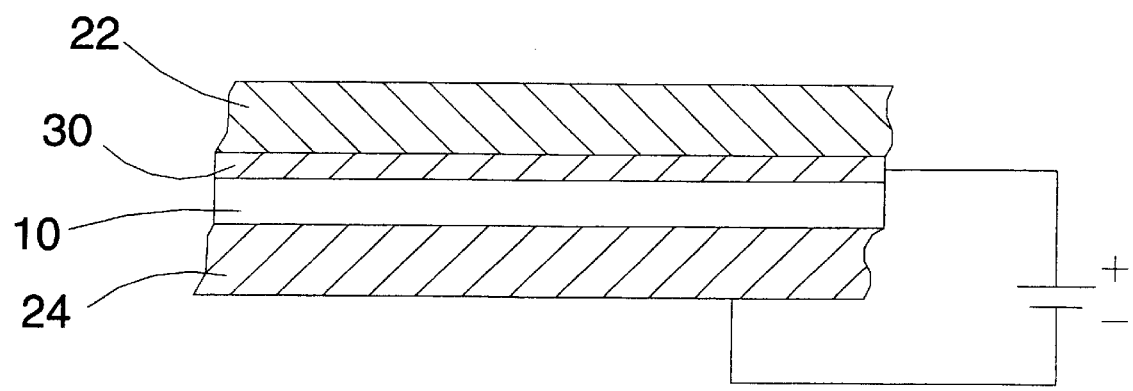
FIG. 3 is a cross-sectional illustration of an embodiment of the invention incorporating a conductive coating into a bonded structure.

FIG. 3 illustrates an embodiment in which the conductive element is a conductive coating 30 coated onto the surface of the non-conductive substrate 22.

The method of the present invention can also electrically cleave a bond between two electrically non-conductive substrates. Disbonding is accomplished by using a bonded structure incorporating two electrically conductive elements. An electrical circuit is completed using the electrically conductive elements and disbonding occurs at the element. FIG. 4 illustrates several bonded structures of the invention.

Figure 4A:
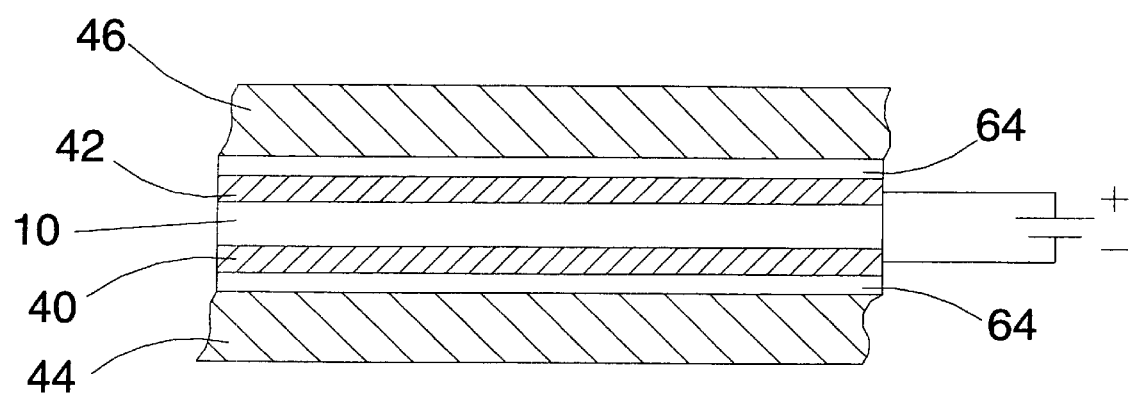
FIGS. 4A–C are illustrations of bonded articles of the invention incorporating electrically conductive sheets or coatings in the bonded structure.

FIG. 4A is a bonded structure incorporating two electrically conductive foils, meshes or grids, 40, 42. The electrochemically disbondable composition 10 is disposed therebetween. The elements 40, 42 are bonded to substrates 44, 46, respectively. Substrates 44, 46 may be conductive substrates, non-conductive substrates or substrates having a non-conductive coating, although the use of conductive elements is useful in those instances when both substrates are non-conductive. Conductive elements are bonded to the substrates using either conventional adhesives or the disbondable composition of the invention 64.

Figure 4B:
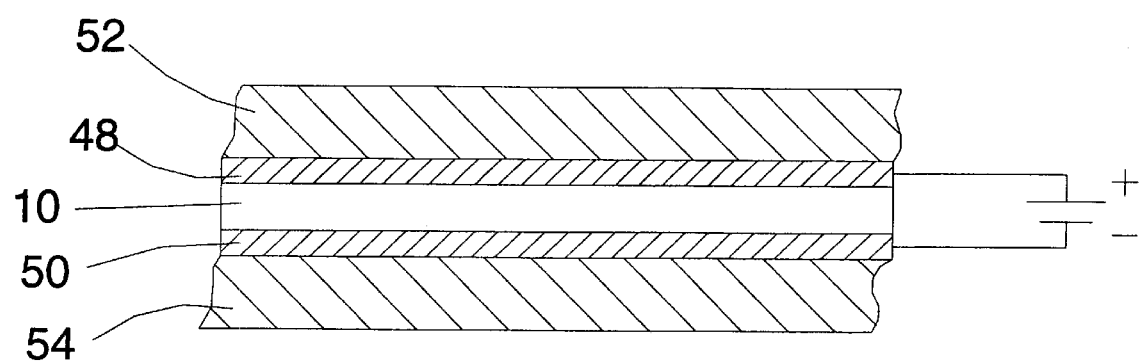

FIG. 4B is a bonded structure incorporating two electrically conductive coatings 48, 50, which coat substrates 52, 54, and which are in electrical contact through external wires with a power source to complete the electrical circuit. The electrochemically disbondable composition 10 is disposed therebetween. Substrates 52, 54 may be conductive substrates, non-conductive substrates or substrates having a non-conductive coating, although the use of conductive elements is useful in those instances when both substrates are non-conductive.

Figure 4C:
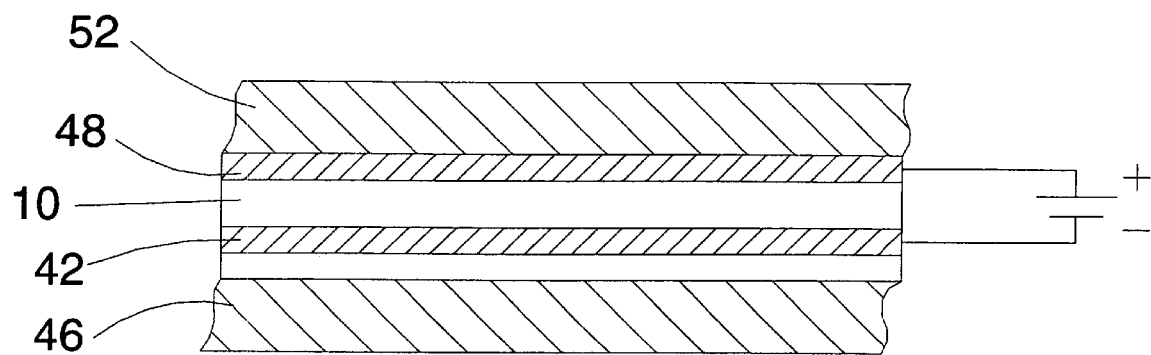

FIG. 4C is a related bonded structure incorporating an electrically conductive foil, mesh or grid 42 and an electrically conductive coating 48 which coats substrate 52. The electrochemically disbondable composition 10 is disposed between the conductive elements 42, 48, which are in electrical contact through external wires with a power source to complete the electrical circuit. Substrates 46, 52 may be conductive or non-conductive, or substrates having a non-conductive coating. The use of conductive elements is advantageous in those instances when both substrates are non-conductive.

Figure 5:
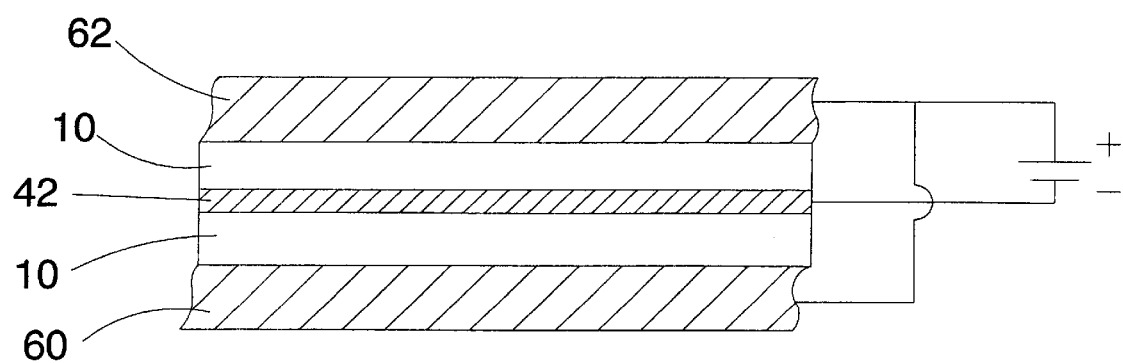
FIG. 5 is an illustration of a bonded joint and electrical circuitry for simultaneous disbonding at more than one interface in a bonded joint.

The disbanding operation may also simultaneously disbond more than one surface, using a setup such as that shown in FIG. 5. The bonded structure includes a conductive element 42 disposed between two substrates 60, 62. Disbondable composition 10 is used in forming the bond. Substrates 60, 62 may be conductive substrates or they may incorporate conductive elements as described hereinabove to facilitate disbanding from non-conductive substrates. Both substrates are connected in parallel to the voltage source at the anode and the conductive elements serves as the cathode (in embodiments where anodic disbonding takes place). In operation, the anodic disbonding material/substrate interfaces are cleaved, leaving a conductive elements coated on both sides with disbonding material.

Figure 6A:
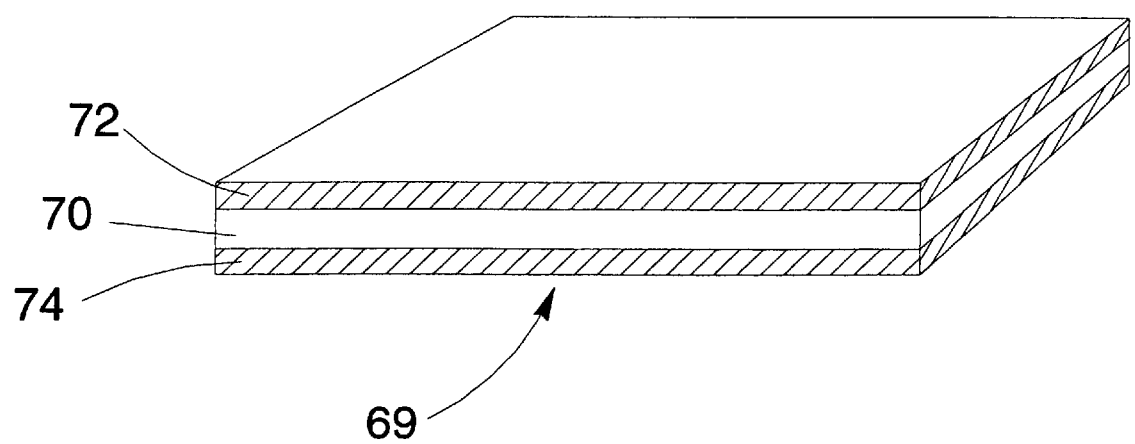
FIG. 6A is a perspective drawing and 6B is a cross-sectional illustration of a laminate bonded structure.

A preferred embodiment of the invention includes a metal foil patch or laminate 69 such as that shown in FIG. 6A. The patch includes a thin layer of electrochemically disbondable material 70, backed on either side by metal foils 72, 74 typically aluminum foil. The patch is flexible and readily conforms to nonplanar surfaces. The patch can be cut to size, coated with adhesive and placed between the substrates to be bonded. Similar to the bonded structures described above, bonded structures formed using a foil patch may be readily separated at the metal foil by passing an electrical current between the foils.

In all of the above structures and articles, contact may be made with the conductive substrate or element through conventional means. Clips or other contacting means may be employed. In preferred embodiments, a conductive tab may be spot welded onto the electrically conductive substrate or element to improve electrical contact.

In another embodiment of the invention, the composition may be formulated with specific curing agents such that the cured material is removed from a substrate using solvents that are comparatively benign to the environment and pose minimal health risk to the practitioner. This embodiment is particularly useful following electrical disbanding of a composition. Residual material of the composition that remains on a substrate following the disbonding can be readily removed without resort to aggressive chemicals, heat or mechanical means. Thus, for example, an adhesive composition that disbonds at the anodic electrode can be removed from the cathodic electrode using a solvent such as a low molecular weight alcohol, e.g. methanol, ethanol, or the like. Removal of the composition is achieved by solvent swelling that is promoted by the rapid passage of the low molecular weight alcohol through the ionically conductive phase of the composition. A composition of this embodiment is described in Example 2.

The disbonding process may also be used to remove material which has been deposited on a substrate as a coating. For example, disbondable material is applied to a metal surface as a primer layer, over which a conductive film, such as silver-filled epoxy, and a suitable topcoat is applied. The coating is removed by attaching a power source to the metal surface (anode) and the silver-filled epoxy layer (cathode).

Alternatively, a conductive metal foil or plate may be contacted to the disbondable primer to serve as a cathode. The electrode serves as the cathode, for example, if the composition disbonds at the anodic interface. Contact is facilitated by placing an ionically conductive gel between the coating and the metal plate. Suitable gels comprise a polymer-thickened solution or liquid polymer electrolyte containing the same salt as is used in the disbanding adhesive, e.g., ammonium hexafluorophosphate.

In a previous embodiment, the use of compositions that could be swelled by a low molecular weight solvent were described. The same embodiment may also be usefully employed with coatings on a substrate. Swelling the ionically conductive phase of the composition with a low molecular weight solvent increases the ionic conductivity of the conductive phase, which promotes disbonding when an electrical voltage is applied between the substrate and coating.

This approach provides the possibility of selectively removing only a portion of the coating as disbonding only occurs where electrochemistry proceeds. Provided that the conductive path through an individual bond is electrically isolated from that of its neighboring bonds, specific bonds on a common substrate may be weakened without affecting adjacent areas, thereby allowing specific repair or replacement to be made. Very often, sporadic damage of coatings on large area surfaces only requires local removal and repair. This material allows that to be readily accomplished.

Appliques, or pre-formed, contact paper-like coatings are increasingly used to coat appliances, structures and vehicles. Use of a metallized or metal foil backed applique attached using the disbanding composition of the invention allows ready removal of the applique during refurbishment operations.

In another aspect of the invention, a corrosion resistant coating is provided. The term 'corrosion' is used herein to mean an electrochemical process leading to the oxidation of a metallic substrate, usually with the help of an electrolyte, typically accompanied by the reduction of atmospheric oxygen or water. A corrosion resistant coating is one that inhibits or hinders active corrosion processes, i.e., metal oxidation, which would otherwise occur in the absence of the coating. Typically, a corrosion resistant coating such as a paint acts as a barrier layer excluding water and salts from the metal surface. The coating may also include corrosion inhibitors which are usually partially soluble in water.

The disbondable composition of the present invention has been found to prevent underpaint corrosion. Underpaint corrosion is defined as the migration of corrosion under the paint (or similar coating) from a site at which active corrosion is taking place due to a break in the paint which exposes the underlying substrate to a corrosive environment.

According to one embodiment of the invention, the disbondable composition is used as an undercoat or primer layer. The undercoat may then be coated with a second paint layer. The second layer provides the principal water and salt barrier.

The inventive composition does not function as a corrosion resistant coating in the sense that it is a barrier layer. Rather, it functions as a corrosion resistant coating by preventing the spread of corrosion once it is initiated. It is hypothesized that the ionic osmotic pressure at the surface is reduced where it is in contact with the electrochemically disbondable material due to the presence of mobile ion species in the coating. Thus, the driving force for corrosive oxidation to propagate on the surface of the metal (ultimately leading to coating delamination) is eliminated or reduced.

An anti-corrosive coating therefore includes a primer layer comprised of the electrochemically disbondable material of the invention and a topcoat functioning as a protective barrier layer. If the barrier layer is compromised, the exposed metallic surface is susceptible to oxidation corrosion; however, the primer layer prevents its propagation underneath the coating and thereby prevents delamination of the coating.

The invention is illustrated in the following examples which are not limiting of the invention, the full scope of which is shown in the claims which follow the specification.

EXAMPLE 1

This example describes an electrochemically disbondable composition using a plasticizer as the ionically conductive component.

A disulfide-linked diepoxide 1 of the following structure was synthesized according to the procedures outlined by Gilbert et al in *Mater. Res. Soc. Proc., Polymer/Inorganic Interfaces,* 304:49 (1993).

1

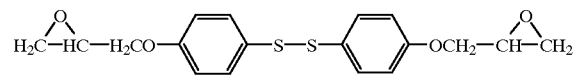

An electrocleavable formulation was made by mixing 100 parts by weight of the above diepoxide with 30 parts of 4,7,10-trioxi-1,13-tridecanediamine and 10 parts of amine-terminated poly(acrylonitrile-co-butadiene), a rubber toughener (CAS 68683-29-4). To this mixture was added 20 parts each of 1-pentanol and ammonium hexafluorophosphate. The mixture reacted rapidly at room temperature to yield a cured resin which exhibited very high adhesive bond strengths to copper. This composition relied upon a combination of a plasticizer and chemical modification of the epoxy, e.g., incorporation of alkoxy-modified amine curing agent and acrylonitrile copolymer and also the disulfide epoxide to gain the requisite ionic conductivity in the product composition.

At room temperature, the ionic conductivity of this material is very low. However, the adhesive bond was electrochemically cleaved in 30 minutes by application of a 50-volt potential across the bond-line at elevated temperatures (60° C.).

This formation was also prepared as a solution in nitromethane which can be spray-coated onto substrates for bonding or coating. This solution has a pot-life of several hours, as compared to fifteen minutes for the epoxy mixture without solvent.

EXAMPLE 2

This example describes an electrochemically disbondable composition using an ion exchanged graft copolymer, poly [dimethylsiloxane-co-methyl(3-hydroxypropyl)siloxane]-graft-poly(ethylene glycol) 3-aminopropyl ether, as the ionically conductive component.

In a reaction vessel equipped with a mechanical stirrer, poly[dimethylsiloxane-co-methyl(3-hydroxypropyl) siloxane]-graft-poly(ethylene glycol) 3-aminopropyl ether (PDMS-graft-PEG) (75 g), an amine-functionalized comb polymer (CAS 133779-15-4) with a $M_n$ of ca. 4000 was mixed with ammonium hexafluorophosphate (25 g, 0.153 mol) and the mixture was stirred at 70° C. for 12 hours under vacuum to allow the ion exchange reaction to proceed to completion. The resulting product was a viscous, transparent amber liquid.

A two-part epoxy resin was formulated using the above ion-exchanged PDMS-graft-PEG. Part A was formulated by blending 100 parts by weight ion-exchanged PDMS-graft-PEG with 75 parts by weight of a low molecular weight ($M_n$=355) diglycidyl ether of bisphenol A (DGEBA) to form a viscous yellow liquid. The blending of the graft copolymer with an epoxy resin promotes dispersion of the electrolyte within the resin, which promotes an interpenetrating morphology of the two components of the adhesive composition. Part B was formulated by reacting 25 parts by weight of the DGEBA with 30 parts by weight of 4,7,10-trioxa-1, 13-tridecanediamine (CAS No. 4246-51-9) to form a chain-extended amine curing agent. Chain extension prereacts the epoxy resins to control the curing process and to provide parts of comparable weight in the two-part resin. Crushed glass (3 parts) and blue pigment (copper phthalocyanine) were added to Part B.

The unmixed two-part epoxy resin had a shelf-life of six months or more at room temperature. It was mixed as a 3:1 ratio of Part A (yellow) to Part B (blue) to give a green-colored paste having a pot life of approximately one hour. The paste was applied between aluminum, copper and steel substrates to form bonded structures. The overall chemical reaction leading to the formation of the disbondable composition is show in Eq. 2.

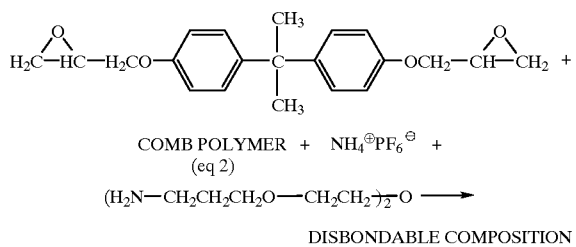

COMB POLYMER + NH$_4^{\oplus}$PF$_6^{\ominus}$ +
(eq 2)
(H$_2$N—CH$_2$CH$_2$CH$_2$O—CH$_2$CH$_2$)$_{\overline{2}}$O ⟶

DISBONDABLE COMPOSITION

Lap shear tests were conducted using an Instron tester according to the specifications of ASTM D-1002, the results of which are reported in Table 2. Lap shear specimens were formed from 1 in.×8 in. metal strips bonded together to have a one-half inch overlap.

TABLE 2

Shear strength of bonded metal substrates.

| Substrate metal | break load (psi) |
| --- | --- |
| aluminum | 1700–2200 |
| steel | 2200 |
| copper | 1600 |

These values are comparable to bonds formed using conventional epoxy resins. Thus, it is possible to form an electrochemically disbondable joint without compromise to the mechanical strength of the bonded materials.

Lap shear tests were also performed to assess the effects of elevated temperature on the adhesive bond strength of bonded aluminum substrates formed using the formula of this example. The results are reported in Table 3.

TABLE 3

Shear strength of bonded aluminum substrates at various temperatures.

| Temperature (° C.) | break load (psi) |
| --- | --- |
| 50 | 1800 |
| 60 | 1400 (yield at 1000) |
| 85 | yield at 800 |

The bonded substrates were electrochemically cleaved at room temperature by applying 50V potential between the metal substrates. Disbonding occurred at the anode. After 10 minutes, the substrates were easily snapped apart by hand. The anodic interface was substantially free of residual resin.

Residual material of the disbondable compositions prepared from 4,7,10-trioxi-1,13-tridecanediamine was removed from the cathode substrate using methanol.

EXAMPLE 3

This example demonstrates the effect of substitution of the amine curing agent on the strength and disbanding function of an epoxy composition.

An epoxy resin was prepared as described in Example 2, with substitution of 4,7,10-trioxa-1,13-tridecanediamine with 15 parts tetraethylene pentamine (TEPA; CAS No. 112-57-2) to yield an electrocleavable composition having bond strengths of up to 2500 psi to aluminum at both ambient and elevated temperatures. The disbonding conditions and rates were similar to those in Example 2. Disbonding occurred at the anode.

EXAMPLE 4

This example demonstrates the effect of substitution of the ion-exchanged anion in PDMS-graft-PEG on the strength and disbonding function of an epoxy.

An epoxy resin was prepared as described in Example 2, with substitution of ammonium tetrafluoroborate for ammonium hexafluorophosphate to yield a resin that cured with increased hardness but with reduced room temperature conductivity. The observed increase in hardness is probably due to increased ionic crosslinking.

Anodic disbanding of this resin can be achieved by applying a 50V potential across the bondline for 40 minutes at room temperature. The longer disbanding time of the formulation with ammonium tetrafluoroborate is due to lower ionic conductivity of the material.

EXAMPLE 5

This example demonstrates the effect of plasticizer incorporation into the composition on disbonding.

Ten parts octanol were added to the resin formulation of Example 3. Aluminum lap shear specimens bonded using the modified formulation exhibited shear strengths of 1600 psi and good mechanical properties. Application of a 50-volt potential at −20° C. resulted in disbonding in less than 15 minutes versus one hour for the unmodified version. At −40° C., disbonding occurred in less than 12 hours versus no disbonding for the unmodified resin.

Thus, addition of plasticizer significantly improved the disbanding capability of the formulation at lower temperatures, which has significant practical application where disbonding operations are required to take place outdoors or in other environmentally uncontrolled conditions. Presumably disbanding at room temperature will proceed significantly faster for the modified formulation.

EXAMPLE 6

This example demonstrates increased ionic conductivity due to heterogeneous curing of the matrix polymer.

Trioxadodecane-1,13-diamine (80 parts by weight) was added to 13× zeolite powder (100 parts by weight) with stirring. The temperature of the mixture was allowed to increase as the amine adsorbed onto the surface and interior of the porous powder. Amine/zeolite complex (160 parts) were added to 100 parts DGEBA epoxy and 10 parts ammonium hexafluorophosphate. Samples made by bonding together aluminum substrates using this formulation were cured at 80° C. for one hour and exhibited good adhesive bond strength. The material exhibited moderate levels of ionic conductivity, about 1/10 that of the material of Example 2. Application of a 50-volt current for two hours at room temperature results in weakening of the adhesive bond.

EXAMPLE 7

This example provides a composition disbondable at the cathodic interface.

Poly(propylene glycol)bis(2-aminopropyl ether) (PPODA, CAS No. 9046-10-1, M$_n$ ca. 2000) was converted into the corresponding ammonium salt by an exchange reaction with ammonium hexafluorophosphate according to the reaction illustrated in Eq(1). To this end, PPODA (75 g) was mixed with ammonium hexafluorophosphate (25 g) in a reaction vessel fitted with a mechanical stirrer and stirred for 48 hours at ambient temperature and pressure.

A blend containing 100 parts of ion-exchanged PPODA and 100 parts the disulfide epoxide of Example 1 was mixed with 8 parts dicyanodiamide. The mixture formed a strong bond to aluminum when cured at 100° C. for 4 hours. The bond can be electrochemically disrupted by applying a 50V potential across the bond for 30 minutes at 40° C. Disbonding occurs at the cathodic interface.

EXAMPLE 8

This example describes disbonding from a non-conductive substrate using a conductive foil.

Aluminum foil (25 μm thick) was solvent degreased and etched with phosphoric acid and immersed in distilled water for one hour. Two sheets of the dried foil were then bonded together using the resin of Example 1 without crushed glass. The foil laminate was cured for one hour at 80° C. The foil laminate 69 is illustrated in FIG. 6A in which electrochemically disbondable composition 70 is sandwiched between foils 72, 74.

Figure 6B:
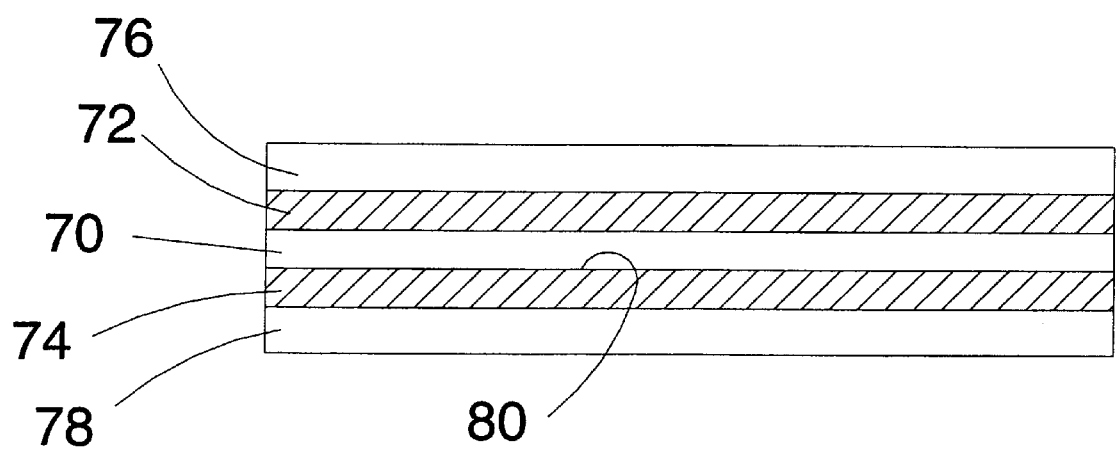

The foil laminate 69 was then further bonded between two substrates. The foil laminate was cut to size appropriate for the substrates to be bonded. The external surfaces of the foil were coated with an amine-cured disulfide epoxy resin that is not electrochemically disbondable. The sandwich structure is shown in FIG. 6B, with conventional adhesive layers indicated as layers 76 and 78 (substrates not shown). The adhesive-coated laminate was disposed between two substrates and pressure was applied using weights or clamps to keep the assembly together. The assembly was cured at room temperature for a period of 24 hours, resulting in a high strength, permanent bond.

The substrates are disbanded by disrupting the bond at the foil/electrochemically disbonding adhesive interface 80, which is indicated in FIG. 6B. A 50V DC power source applied a potential difference across the bonded structure for 10 minutes, after which the structure could be snapped apart by hand. The foil was peeled off of the still-attached conventional epoxy layer. The substrate was cleaned of the residual adhesive by soaking in a solution of ammonia water, sodium 3-mercaptopropyl sulfonate and methanol.

EXAMPLE 9

This example describes disbonding from a non-conductive substrate using a conductive coating.

Non-conducting substrates were coated with a silver-filled epoxy. Connectors for external wiring were attached to the silver-filled epoxy. Following cure, a layer of electrochemically disbonding epoxy resin from Example 1 was coated over the silver-filled epoxy. The coated substrate surfaces were mated and the resin was cured, forming an adhesive bond. This bond was electrochemically disbonded by attaching a 50V power source either directly to the silver-filled epoxy layers or to the connectors. Disbonding occurs in 20–40 minutes at room temperature, depending on the roughness of the silver epoxy.

EXAMPLE 10

This example describes disbonding of a coating.

The resin from Example 1 was coated directly onto a low carbon steel surface as a primer layer. The coating can be applied from the bulk material or by spraying a 50 wt % solution of the uncured resin in a 1:1 mixture of nitromethane and methylene chloride. After drying, the primer layer was overcoated with a thin layer of silver-filled epoxy and a suitable topcoat. The ionically conductive primer layer provided exceptionally good wet adhesion under highly corrosive conditions. Attachment of a 50V power source between the steel surface and the silver-filled epoxy resulted in disruption of the adhesive bond between the primer and the steel surface, allowing the coating to be easily removed by scraping. No corrosion was observed on the surface from which the coating was removed.

EXAMPLE 11

This example describes another method of disbonding a coating using an electrolyte gel.

The resin from Example 1 was coated directly onto a low carbon steel surface as a primer layer and allowed to cure. The cured coating was then electrically disbanded by the following procedure. A thickened gel comprised of ammonium hexafluoride-exchanged PPODA was spread over the surface of the primer-coating and physically contacted with a conductive element, such as a wire, mesh, foil or grid. Attachment of a 50V power source to the steel surface (anode) and the conductive element (cathode) for a period of less than 20 minutes resulted in anodic disruption of the adhesive bond between the primer and the steel surface.

EXAMPLE 12

This example describes disbanding of a pigmented coating.

To 100 parts by weight of the material of Example 2, was mixed 65 parts by weight titanium dioxide (rutile) pigment to yield a white paint. This paint can be used to coat aluminum, steel or other metal surfaces. The coating was locally disbanded by contacting a conducting plate, coated with an ionically conducting gel, to the paint surface and attaching the positive pole of a 50-volt power source to the coated substrate and the negative pole of the power source to the conducting plate. After 10–15 minutes, the paint was easily removed from the treated area by light scrapping or peeling.

EXAMPLE 13

This example describes an electrically disbanding composition employing a dimethicone polyol comb polymer. The dimethicone polyol comb polymer of this example is obtained as a commercial product of the Dow Corning Company under the tradename "193 SURFACTANT."

The disbonding composition is formulated as follows: 25 parts of ammonium hexafluorophosphate is added to 75 parts of Dow 193 surfactant heated to 80° C. with stirring. After the salt has completely dissolved (ca. 1 hour), the mixture is cooled and blended with 100 parts of DGEBA epoxy resin. This blend is mixed with 17 parts of TEPA to yield an electrically disbanding epoxy formulation exhibiting good adhesion to a variety of substrates. Bonded metal samples exhibiting adhesive shear strengths over 1000 psi are produced using this resin. These samples are readily disbonded by applying 10–50 V across the bondline between the metal and disbondable composition. A one square inch bond between aluminum substrates was separated by hand after applying 45 V for 5 s.

EXAMPLE 14

This example describes an electrically disbanding composition employing another dimethicone polyol comb polymer. The dimethicone polyol comb polymer of this example is obtained as a commercial product of the Goldschmidt Chemical Company under the tradename "TEGOPREN 5843."

The disbonding composition is formulated as follows: 25 parts of ammonium hexafluorophosphate is added to 75 parts of TEGOPREN 5843 heated to 80° C. with stirring. After the salt has completely dissolved (ca. 1 hour), the mixture is cooled and blended with 100 parts of DGEBA epoxy resin. This blend is mixed with 17 parts of TEPA to yield an electrically disbonding epoxy formulation exhibiting good adhesion to a variety of substrates. Bonded metal samples exhibiting adhesive shear strengths over 1000 psi are produced using this resin. These samples are readily disbonded by applying 10–50 V across the bondline between the metal and disbondable composition. A one square inch bond between aluminum substrates was separated by hand after applying 45 V for 5 s.

EXAMPLE 15

This example describes an electrically disbonding composition employing a linear block copolymer. The block copolymer is poly(ethylene glycol)-block-poly(propylene glycol)-block-poly(ethylene glycol), CAS 9003-11-6.

The disbanding composition is formulated as follows: 25 parts of ammonium hexafluorophosphate is added to 75 parts of poly(ethylene glycol)-block-poly(propylene glycol)-block-poly(ethylene glycol), CAS 9003-11-6, heated to 80° C. with stirring. After the salt has completely dissolved (ca. 1 hour), the mixture is cooled and blended with 100 parts of DGEBA epoxy resin. This blend is mixed with 17 parts of TEPA to yield an electrically disbonding epoxy formulation exhibiting good adhesion to a variety of substrates. Bonded metal samples exhibiting adhesive shear strengths over 1000 psi are produced using this resin. These samples are readily disbonded by applying 50 V across the bondline between the metal and disbondable composition.

EXAMPLE 16

This example describes an electrically disbonding composition employing a linear block copolymer. The block copolymer is polyethylene-block-poly(ethylene glycol), CAS 97953-22-5.

The disbanding composition is formulated as follows: 25 parts of ammonium hexafluorophosphate is added to 75 parts of polyethylene-block-polyethylene(glycol), CAS 97953-22-5, heated to 80° C. with stirring. After the salt has completely dissolved (ca. 1 hour), the mixture is cooled and blended with 100 parts of DGEBA epoxy resin. This blend is mixed with 17 parts of TEPA to yield an electrically disbonding epoxy formulation exhibiting good adhesion to a variety of substrates. Bonded metal samples exhibiting adhesive shear strengths over 1000 psi are produced using this resin. These samples are readily disbonded by applying 50 V across the bondline between the metal and disbondable composition.

EXAMPLE 17

This example describes an electrically disbanding composition employing lithium (trifluoromethane) sulfonimide as a salt that imparts ionic conductivity to the composition.

The disbanding composition is formulated as follows: 25 parts of lithium (trifluoromethane) sulfonimide are dissolved in 75 parts of Dow Corning 193 surfactant at 80° C. with stirring. 100 parts of DGEBA epoxy resin are reacted with 10 equivalents (2.9 parts) of lithium dihydrogen phosphate at 120° C. and then blended with the lithium triflimide mixture. The blend can be cured with TEPA at 80° C. to form a resin that adheres strongly to aluminum. These samples are readily disbonded by applying 50 V across the bondline between the metal and disbondable composition.

What is claimed is:

1. A composition, comprising:
 a matrix functionality capable of providing an adhesive bond having a shear strength of greater than 200 psi to an electrically conductive surface, and an electrolyte functionality providing sufficient ionic conductivity to the composition so that, when the matrix functionality forms the adhesive bond to the electrically conductive surface, the composition can support a faradaic reaction with the electrically conductive surface, the faradaic reaction weakening the adhesive bond,
 wherein the electrolyte functionality is provided by a block copolymer or a graft copolymer.

2. The composition of claim 1, wherein the graft polymer comprises a siloxane backbone and pendant blocks of high ionic conductivity.

3. The composition of claim 2, wherein the pendent blocks comprise polyether or polyglycol moieties.

4. The composition of claim 1, wherein the graft copolymer comprises dimethicone polyols.

5. The composition of claim 1, wherein the graft copolymer is selected from the group consisting of:
 dimethyl-methyl(polyethylene oxide) siloxanes, alkoxylated 3-hydroxypropyl-terminated dimethyl siloxanes, and dimethyl-methyl(3-hydroxypropyl) siloxanes.

6. The composition of claim 1, wherein the block copolymer comprises a linear block copolymer having matrix miscible and matrix immiscible blocks.

7. The composition of claim 6, wherein the matrix miscible blocks are selected from the group consisting of aliphatic and aromatic polyethers, nitrile-functionalized polymers, acrylic and vinyl polymers and polyamides.

8. The composition of claim 6 or 7, wherein the matrix immiscible blocks are selected from the group consisting of aliphatic and aromatic hydrocarbon polymers, acrylic and vinyl polymers, silicone polymers, phosphazine polymers, fluoropolymers, polysulfides, polyesters, polyamides and rigid-rod polymers.

9. The composition of claim 6, wherein the linear block copolymer comprises polyethylene-block-poly(ethylene glycol).

10. The composition of claim 6, wherein the linear block copolymer comprises poly(ethylene glycol)-block-poly (propylenene glycol)-block-poly(ethylene glycol).

11. The composition of claim 1, wherein the matrix functionality comprises a polymer selected from the group consisting of epoxies, phenolics, acrylics, melamines, maleimides, and polyurethanes and combinations thereof.

12. The composition of claim 1, wherein the electrolyte functionality includes a salt capable of being solvated into the composition.

13. The composition of claim 12, wherein the salt is selected from the group consisting of alkali metal, alkaline earth and ammonium salts.

14. The composition of claim 12, wherein the salts include an anion selected from the group consisting of hexafluorophosphate, tetrafluoroborate, hexafluoroantimonate and perchlorate.

15. The composition of claim 12, wherein the salt is selected singly or as a mixture from the group consisting of lithium trifluoromethane sulfonimide and lithium trifluromethane sulfonate.

16. The composition of claim 1, wherein the composition has an ionic conductivity in the range of $10^{-11}$ to $10^{-5}$ S/cm$^2$.

17. The composition of claim 1, further comprising an additive selected from the group consisting of pigments, corrosion inhibitors, leveling agents, gloss promoters, rubber tougheners and fillers.

18. The composition of claim 1, wherein the composition is an adhesive.

19. The composition of claim 1, wherein the composition is a coating.

20. The composition of claim 1, wherein the shear strength of the adhesive bond is at least 1000 psi.

21. A composition, comprising:

a curable polymeric material; and an electrolyte located in the curable material, wherein the curable polymeric material, when cured, can form an adhesive bond having a shear strength of greater than 200 psi with an electrically conductive surface, and the composition has an electrolyte functionality that provides sufficient ionic conductivity to support a faradic reaction at the electrically conductive surface, the faradic reaction weakening the adhesive bond, and wherein the electrolyte functionality is provided by a block copolymer or a graft copolymer.

22. The composition of claim 21, wherein the curable material is selected from the group consisting of epoxy resins, phenolic resins, acrylic resins, melamine resins, malemide resins, and urethanes.

23. The composition of claim 21, wherein the shear strength of the adhesive bond is at least 1000 psi.

24. A bonded structure, comprising:

a first material layer having an electrically conductive surface;

a second material layer having an electrically conductive surface; and a composition disposed between the electrically conductive surface of the first material layer and the electrically conductive surface of the second material layer, the composition comprising:

a matrix functionality; and an electrolyte functionality provided by a block copolymer or a graft copolymer, wherein:

the matrix functionality forms an adhesive bond having a shear strength of greater than 200 psi to the electrically conductive surface of the first material layer, and the electrolyte functionality provides sufficient ionic conductivity to the composition so that the composition can support a faradic reaction at the electrically conductive surface of the first material layer, the faradic reaction weakening the adhesive bond.

25. The composition of claim 24, wherein the shear strength of the adhesive bond is at least 1000 psi.

26. A method of disbonding a composition from an electrically conductive surface to which it is bonded, comprising:

treating a first electrically conductive surface with a composition having a matrix functionality and an electrolyte functionality, the matrix functionality providing an adhesive bond having a shear strength of greater than 200 psi to the first electrically conductive surface, and the electrolyte functionality providing sufficient ionic conductivity to the composition to support a faradaic reaction at an interface of the first electrically conductive surface and the composition, wherein the electrolyte functionality is provided by a block copolymer or a graft copolymer;

contacting a second electrically conductive surface to the composition; and applying a voltage across the composition to cause a faradaic reaction at the first electrically conductive surface, whereby the adhesive bond to the first electrically conductive surface is weakened.

27. The composition of claim 26, wherein the shear strength of the adhesive bond is at least 1000 psi.

* * * * *

UNITED STATES PATENT AND TRADEMARK OFFICE
CERTIFICATE OF CORRECTION

PATENT NO. : 6,620,308 B2
DATED : September 16, 2003
INVENTOR(S) : Michael D. Gilbert It is certified that error appears in the above-identified patent and that said Letters Patent is hereby corrected as shown below:

Column 4,
Line 57, change "poly(propylenene glycol)" to -- poly(propylene glycol) --

Column 5,
Line 3, change "trifluromethane" to -- trifluoromethane --
Line 20, change "malemide" to -- maleimide --

Column 7,
Line 27, change "nitrites" to -- nitriles --

Column 10,
Line 11, change "poly(propylenene glycol)" to -- poly(propylene glycol) --

Column 18,
Line 16, change "formation" to -- formulation --

Column 24,
Line 43, change "propylenene" to -- propylene --
Line 61, change "fluromethane" to -- fluoromethane --

Column 25,
Line 61, change "malemide" to -- maleimide --

Signed and Sealed this

Twenty-fourth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,620,308 B2
DATED : September 16, 2003
INVENTOR(S) : Michael Gilbert It is certified that error appears in the above-identified patent and that said Letters Patent is hereby corrected as shown below:

Column 1,
Line 18, change "disbanded" to -- disbonded --

Column 2,
Line 22, change "disbanded" to -- disbonded --

Column 4,
Lines 6, 22 and 24, change "disbanding" to -- disbonding --

Column 5,
Line 57, change "disbanding" to -- disbonding --

Column 7,
Line 20, change "disbanding" to -- disbonding --

Column 8,
Lines 26, change "disbanding" to -- disbonding --
Line 45, change "disband-" to -- disbond- --

Column 10,
Line 14, change "disbanding" to -- disbonding --

Column 11,
Lines 37 and 47, change "disbanding" to -- disbonding --

Column 12,
Lines 46, 51 and 62, change "disbanding" to -- disbonding --
Lines 52, 53, 55, 58 and 66, change "disbandment" to -- disbondment --

Column 13,
Lines 34 and 39, change "disbanding" to -- disbonding --

Column 14,
Line 3, change "disbanded" to -- disbonding --
Lines 24, 29, 34 and 53, change "disbanding" to -- disbonding --

Column 15,
Lines 41 and 48, change "disbanding" to -- disbonding --

Column 16,
Lines 10, 38 and 63, change "disbanding" to -- disbonding --

UNITED STATES PATENT AND TRADEMARK OFFICE
CERTIFICATE OF CORRECTION

PATENT NO. : 6,620,308 B2
DATED : September 16, 2003
INVENTOR(S) : Michael Gilbert It is certified that error appears in the above-identified patent and that said Letters Patent is hereby corrected as shown below:

Column 19,
Line 58, change "disbanding" to -- disbonding --

Column 20,
Lines 12, 14, 30 and 34, change "disbanding" to -- disbonding --

Column 21,
Line 31, change "disbanded" to -- disbonded --

Column 22,
Lines 12 and 29, change "disbanded" to -- disbonded --
Lines 23, 39, 50 and 60, change "disbanding" to -- disbonding --

Column 23,
Lines 20, 40, 55 and 58, change "disbanding" to -- disbonding --

Signed and Sealed this

Eleventh Day of May, 2004

JON W. DUDAS
*Acting Director of the United States Patent and Trademark Office*